Feb. 28, 1961 W. S. ERWIN 2,972,882
APPARATUS FOR MEASURING COATING THICKNESSES
Filed Aug. 12, 1952

CALIBRATION FOR NICKEL PLATING
ON STEEL

CALIBRATION FOR COPPER
ON STEEL

Inventors
Wesley S. Erwin, deceased
By Kathrine S. Erwin, Administratrix
Willits, Helwig & Baillio
Attorneys

2,972,882

APPARATUS FOR MEASURING COATING THICKNESSES

Wesley S. Erwin, deceased, late of Detroit, Mich., by Kathrine S. Erwin, administratrix, Birmingham, Mich., assignor to General Motors Corporation, Detroit, Mich., a corporation of Delaware Filed Aug. 12, 1952, Ser. No. 304,041

2 Claims. (Cl. 73—15)

This invention relates to the measurement of coating thicknesses and particularly to apparatus for thermoelectrically measuring the thicknesses of electroplated coatings. This application is somewhat related to applications Serial No. 312,624 and Serial No. 319,163, now Patent No. 2,750,791, filed in the names of Eugene A. Hanysz and Edward F. Weller, Jr., owned by the assignee of the present invention.

Measuring the thicknesses of electroplated layers has long been a problem in industry. Some of the prior means of measuring these thicknesses have been destructive in that they marred the plated surface or required an actual measuring of a specimen cut from the desired portion of the plate. Other methods heretofore used have been time consuming and not adaptable for use in mass production of plated parts where the thickness of a particular plated section is critical and must be checked at varying stages of production.

Among the objects of the present invention are the following: to provide a thermoelectric apparatus for measuring thickness of electroplated coatings, to provide apparatus which may be used to rapidly measure the thickness of metallic coatings and which is suitable for use in the mass production of plated parts in a variety of shapes where the thickness of various metallic layers must be checked periodically during the manufacture. Other objects and advantages of this invention will more fully appear as the description proceeds.

Generally, the practice of this invention involves measuring a plate thickness by thermoelectric means whereby the temperature of a small area of the plated surface is made to vary with the thickness of plating. Measurement of this surface temperature by thermocouple means thus provides a method of measuring the plate thickness. By suitable calibration the measuring device can be made to indicate this thickness directly.

In a practical application of measuring the thickness of a metallic coating according to this invention, a heated probe and an unheated or "cold" probe are placed against the surface of a coating whose thickness is to be measured. Placing the probes against the plated surface in this manner causes a small area under the hot probe to become heated. The actual temperature resulting at the junction between the heated probe and the plated metal surface is dependent on the composite thermal conductivity of the base material and of the electroplated material. If both these materials were theoretically perfect conductors of heat having an infinite thermal mass, the surface temperature of the plated specimen would remain constant and the heat from the heated probe would flow freely into it. On the other hand, if both the plated surface and the base material were perfect insulators, no heat would flow and the temperature would not be altered in either the plated surface or the heated probe.

However, these theoretical situations do not apply in the consideration of a practical application. Metals generally are all good conductors of heat. Therefore, there will always be a certain flow of heat from the heated probe to the metal surface with a corresponding change in temperature of the plated surface at the junction between the heated probe and the plated surface. If the plated metal has the same thermal conductivity as the base material, its thickness is unimportant because the plate and the base will behave as though they were of a single material. However, in actual practice, the thermal conductivity of electroplated material normally is quite different from the thermal conductivity of the base material. The changed temperature at the hot junction results therefore, from the composite conductivity of the plate and the base material.

Different thicknesses of plate have different thermal conductivities so that the resulting heat conduction will vary with different thicknesses. If the deposited metal layer has a greater thermal conductivity than the base metal, it will absorb heat from the heated probe and will tend to decrease the junction temperature in a manner directly proportional to the thickness of the plate. Likewise, if the metal layer has a lower thermal conductivity than the base, it would tend to retard the flow of heat from the heated probe and will cause the junction temperature to increase. Thus, it will be seen how the varying thickness of a deposited metal layer changes the resulting junction temperature.

In accordance with this invention, the junction temperature is measured by applying the well known thermocouple principle, i.e. whereby a heated metallic junction will generate a small D.C. voltage. The unheated probe, placed in contact with the plated surface serves as a "cold" terminal of a thermocouple compensating for changes in ambient temperatures of the materials under test. The heated probe serves as a "hot" terminal to form a series pair of thermocouple junctions. In an ordinary thermocouple, two fixed wires of a known alloy are used and the resulting voltage generated is measured to indicate the temperature at the hot junction. In this invention, the test probes each serve as one of the wires of a conventional thermocouple. The electroplated material, of a known metal or alloy and having a thickness to be measured, serves as the second wire of two to complete the thermocouple circuit to the measuring instrument. Since the temperature of the probe is maintained at a predetermined value, the electromotive force generated will depend on the thermal conductivity of the deposited coating and will vary with the thickness of this coating. Thus, the junction temperature, dependent on the thickness of the plate, is used to indicate the plate thickness. If desired, the electrical measuring device used may be calibrated to read directly in terms of thickness. It may be calibrated with readings taken on several specimens having a known plate thickness.

In the drawings:

Referring now to the figures of the drawing.

Figure 1:
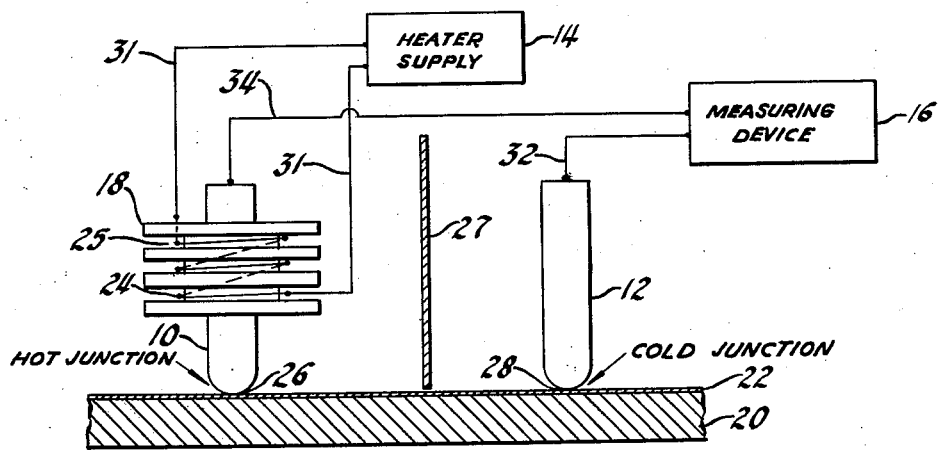
Figure 1 is a diagrammatic view of the electrical circuit of a measuring device embodying the invention.

Referring more particularly to the figures of the drawing; the measuring apparatus indicated generally in Figure 1 comprises a heated probe 10, an unheated or cold probe 12, a source of heat 14 for the heated probe, and a suitable electrical measuring device 16. It is not essential that the material from which the heated probe 10 and the cold probe 12 are formed be of the same material or have the same thermal conductivity as the base material 20. However, very satisfactory results have been obtained using probes having substantially the same thermal conductivity as the base material 20. While other type probes may be used, probes having convexly curved contact ends, such as are shown in Figure 1, are preferred.

As shown in Figure 1, and heated probe 10 has a finned heater section 18 surrounding it. This finned heater section 18, preferably formed of a metal having a high heat conductivity such as brass, serves both to house the heating coil 24 and to allow a better dissipation of the heat at all times, thus providing a more uniform probe temperature. The heating coil 24 is fitted into the groove 25 of the finned section and may be insulated with a conventional ceramic cement. Average temperatures employed during operation may be in the ranges of 100° F. to 110° F. at the contact 26 between the hot probe 10 and the coated surface 22 and 150° F. to 170° F. at the finned heater section 18. It will be understood, of course, that these temperature ranges are illustrative only of typically practicable operating conditions and may be varied depending on such factors as the thickness of the coating to be measured and its thermal conductivity. The apparatus will operate satisfactorily over a wide range of temperatures limited generally only by practical considerations of operating within temperature ranges in which the materials from which the apparatus is constructed are not adversely affected. It is only essential that a temperature differential exist between a probe and the surface of the coating 22 to cause a flow of heat. This temperature differential may be maintained at any practical temperature level. As an example, in measuring thicknesses of coatings which themselves are at a high temperature, the hot probe 10 may be maintained at a higher temperature to create the temperature differential. It will be understood, of course, that the plating thickness of a hot specimen may also be measured by using the cold thermocouple junction as the measuring junction if desired. To obtain accurate thermocouple readings, thermal equilibrium conditions must exist. Enough heat must be supplied at the heated junction 26 to balance the heat removed in order to maintain this equilibrium condition. The probes 10 and 12, in the preferred embodiment of the invention, are mounted together as a unit. Between the two probes, there may be a partition 27 to serve as a heat shield for the cold probe 12. If desired, the heated probe 10 may have separate cooling fins in addition to the fins 18.

The heating supply circuit indicated generally by 31 is separate from the temperature measuring thermocouple circuit and may be any conventional resistance type heating circuit such as those used to heat electric soldering irons. In a preferred embodiment, the wires 24 are of nickel because its large positive temperature coefficient of electrical resistance facilitates the rate of heating and aids in temperature regulation. As shown in Figure 1, these resistance wires are connected by electrical leads 31 to a source of electrical current 14 at the heater supply.

When contact is made between the plated surface and the two probe members, two thermocouples are formed, one at each junction. The thermoelectric E.M.F.'s obtained at each junction are characteristic of the materials and are generated so as to be series opposed. The result is a differential E.M.F. which can be measured across the probes 10 and 12 by the measuring device 16. Electrical leads 32 and 34 to the probes also form thermocouples, but since the E.M.F.'s generated here are constant, they can be disregarded when the measuring instrument is being calibrated to read in terms of coating thickness.

The electrical measuring device 16 may be a millivoltmeter, a milliammeter, or any other suitable measuring instrument. The voltage generated by the probes could be read directly on a sensitive millivoltmeter if desired, but where a faster response is required, an amplifier may be used. The small E.M.F. from the probes may be coupled through a D.C. to A.C. converter to the input of a transformer and the secondary of the transformer tuned and coupled to a two-stage resistance-coupled voltage amplifier. If desired, the output of the amplifier can be connected to a phase sensitive detector having a differential thermal E.M.F. meter connected in its cathode circuit. To obtain more uniform readings, a constant voltage transformer may be used to feed the phase detector as well as the amplifier and the probe heater winding to prevent any changes from occurring in the meter readings due to line voltage variation.

Figure 2:
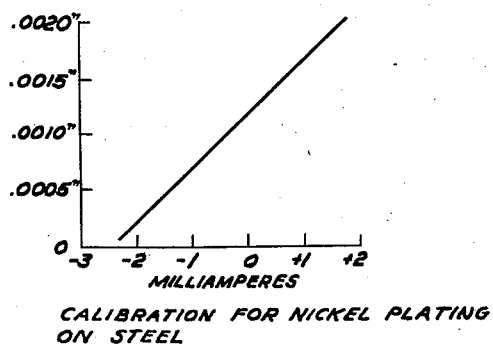
Figure 2 is a graph showing a calibration curve for converting milliammeter readings into terms of thickness for the plating of nickel on a steel base.

Figure 2 is a sample calibration curve for the plating of nickel on a steel base. It illustrates that for thicknesses up to 0.002 inch the readings obtained are nearly linearly proportional to thickness. Using a microvoltmeter with 3/8" diameter spherical-ended probes, the microvolt scale may be calibrated for plate thicknesses up to about 0.004". Since this calibration becomes non-linear above 0.002" and approaches zero sensitivity above 0.004", it must be specially calibrated with several known samples. Above 0.004" of nickel plate thickness using the above mentioned 3/8" diameter spherical-ended probes, the readings become constant even with an increasing plate thickness. This illustrates one of the problems encountered in this type of measurement, i.e. that if the plating thickness becomes too great, the effect of the base metal thermal conductivity is reduced. This may be counteracted by either increasing the diameter of the convexly curved probes or by increasing the temperature of the heated probe 10 to again make the base metal effective. An analogous problem exists when the composite thickness of the plating and base metal becomes too thin, since a normal transfer of heat from that locale will not occur under these conditions. This may be counteracted by backing the base metal with another piece of material having a high thermal mass permitting normal heat flow from the locale. The minimum thickness of the plating that can be measured depends both on the type of the plating metal and also on the kind of base metal used. The minimum thickness of base metal which may be used with this invention is about 1/8" unless the cold probe 12 is applied on the opposite face of the base metal, in which event much smaller base metal thicknesses are satisfactory.

Figure 3:
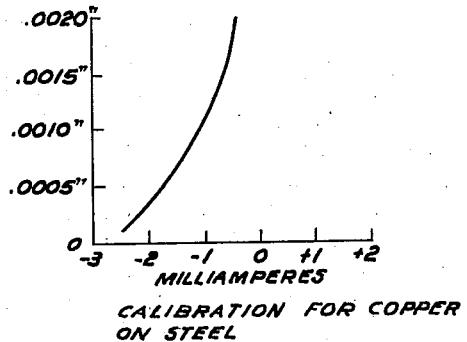
Figure 3 is a similar graph showing calibration curves for converting meter readings into terms of thickness for the plating of copper on steel.

Figure 3 shows a similar calibration for the plating of copper on steel. In this case, the readings are not linear over the range 0–0.002". The calibrations of both Figures 2 and 3 were obtained from runs on Bureau of Standards electroplated samples. In actual operation, in order to obtain more accurate readings, the calibrations of course may be made on prepared stock selected from the actual material upon which readings are to be taken. In addition to the measurement of thicknesses of single metals or alloys, the method and apparatus of this invention may be used to measure the thickness of thin laminated sections in an analogous manner.

It is to be understood that, although the invention has been described with specific reference to a particular embodiment thereof, it is not to be so limited since changes and alterations therein may be made which are within the full scope of this invention as defined by the appended claims.

I claim:

1. An apparatus for thermoelectrically measuring the thickness of a metallic coating on a base metal, said apparatus comprising a first metallic probe member having a convexly curved contact end, a second metallic probe member having a convexly curved contact end, both of said probes being of metal forming thermoelectric junctions with said metallic coating, an electrical resistance heater surrounding said first probe for heating it to a predetermined temperature, a heat shield between said probes and an electrical indicating device connected in series with said probe members to indicate a differential E.M.F. generated upon contact of said probe members with a metallic surface.

2. An apparatus for thermoelectrically measuring the thickness of a metallic coating on a metallic base in which coating and base are of different metals, said apparatus comprising a first metallic probe member having a convexly curved contact end, a second metallic probe member having a convexly curved contact end, both of said probes being of metal the same as that of the base and different than that of the coating to form thermoelectric junctions therewith, an electrical resistance heater surrounding said first probe for heating it to a predetermined temperature, a heat shield between said probes, and an electrical indicating device connected in series with said probe members to indicate a differential E.M.F. generated upon contact of said probe members with a metallic surface.

References Cited in the file of this patent

UNITED STATES PATENTS

| | | |
|---|---|---|
| 2,264,968 | De Forest | Dec. 1, 1941 |
| 2,330,599 | Kuehni | Sept. 28, 1943 |
| 2,342,029 | Zubko | Feb. 15, 1944 |
| 2,446,283 | Hulsberg | Aug. 3, 1948 |

FOREIGN PATENTS

| | | |
|---|---|---|
| 23,580 | Germany | Sept. 5, 1883 |
| 270,583 | Germany | Feb. 18, 1914 |
| 702,856 | Germany | Feb. 18, 1941 |
| 713,640 | France | Oct. 30, 1931 |